United States Patent [19]

Wouda

[11] 4,277,509
[45] Jul. 7, 1981

[54] PROCESS FOR EXTRACTING GROUND ROASTED COFFEE

[75] Inventor: Hermanus A. J. Wouda, Utrecht, Netherlands

[73] Assignee: D.E.J. International Research Company B.V., Utrecht, Netherlands

[21] Appl. No.: 947,404

[22] Filed: Oct. 2, 1978

[30] Foreign Application Priority Data

Oct. 6, 1977 [GB] United Kingdom ............... 41570/77

[51] Int. Cl.³ .............................................. A23F 3/00
[52] U.S. Cl. .................................... 426/387; 426/432; 426/476
[58] Field of Search ............... 426/432, 434, 594, 387, 426/388, 429, 476; 99/289 R, 287, 318, 323.3

[56] References Cited

U.S. PATENT DOCUMENTS

| | | | |
|---|---|---|---|
| 1,123,828 | 1/1915 | Whitaker | 426/594 |
| 2,340,758 | 2/1944 | Kappenberg | 426/432 |
| 2,380,046 | 7/1945 | Huguenin | 426/434 |
| 2,513,813 | 7/1950 | Milleville | 426/429 |
| 2,949,364 | 8/1960 | Bilenker | 426/432 |
| 3,361,572 | 1/1968 | Nutting et al. | 426/432 |
| 3,995,067 | 11/1976 | Marsh et al. | 426/432 |
| 4,100,306 | 7/1978 | Gregg et al. | 426/432 |

FOREIGN PATENT DOCUMENTS 402344 9/1965 Australia .
1032825 6/1978 Canada ..................................... 426/432

Primary Examiner—Joseph M. Golian
Assistant Examiner—George C. Yeung
Attorney, Agent, or Firm—Cushman, Darby & Cushman

[57] ABSTRACT

Primary extraction of ground roasted coffee. The coffee is first extracted with an amount of aqueous extraction liquid sufficient to extract substantially all of the dry soluble solids from the coffee, but preferably not so large that the extract must be concentrated for further processing. The coffee is next extracted with an aqueous extraction liquid to extract hydrophobic flavor components. The hydrophobic flavor components are removed from the resulting extract by stripping and recovered as a concentrated aqueous solution.

9 Claims, 4 Drawing Figures

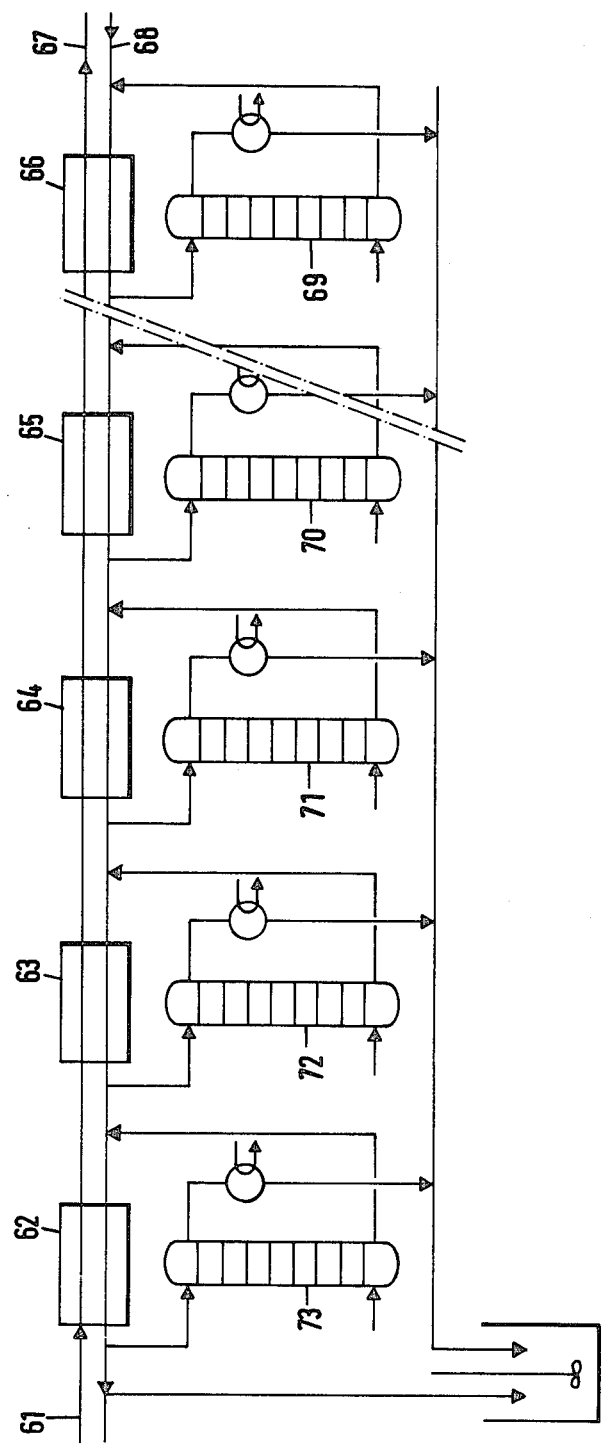

PROCESS FOR EXTRACTING GROUND ROASTED COFFEE

This invention relates to a method for the primary extraction of ground roasted coffee.

In the manufacture of coffee extract from ground roasted coffee it is customary in a first step to extract the material in counter-current with water at a temperature around or somewhat below 100° C. This is called "primary extraction". At the temperature referred to there is substantially no hydrolysis of coffee solids. To increase the yield it is further customary to subject the primary extracted coffee grounds to higher temperature, thereby hydrolysing and solubilizing insoluble coffee solids. The present invention, however, only relates to the primary extraction process.

The substances extracted in the process of primary extraction are aroma components and solid "dry matter" soluble at the temperatures employed. The aroma components can be subdivided into substances which are comparatively readily dissolved from the coffee by water, which we shall call "hydrophilic", and others which are comparatively poorly dissolved from the coffee by water, which we shall call "hydrophobic". The "dry matter" is comparatively readily dissolved by water.

The hydrophobic character of some aroma components is due to the fact that roasted coffee contains coffee oil. During the extraction of the coffee with water the aroma components will be divided over the oil phase and the water phase according to their partition coefficients. The partition coefficient is defined as the ratio of the concentrations of an aroma in the oil phase and the water phase respectively when both phases are in equilibrium. It has been found that some important aroma components have a partition coefficient much greater than 1. This means that these aroma components are preferentially in the oil phase. To extract these aroma components in a sufficient amount it is therefore necessary to use a high water-to-coffee ratio. Thus in the preparation of a domestic brew, for example, the water-to-coffee ratio which is usually applied is about 20. When coffee is extracted at a high water-to-coffee ratio, a dilute extract is obtained. This means that the extract has to be concentrated before it can be dried or sold as an extract in an economical way.

If the extract is concentrated by evaporation, the greater part of the volatile aroma components will be lost. It is therefore customary to remove the volatile aroma components as much as possible from the extract before concentration e.g. by stripping the extract with steam and recovering the aromas by condensing the steam. The condensate can be concentrated further by distillation. A part of the aromas, however, i.e. aromas which have a relative volatility with respect to water close to unity, cannot be recovered by stripping and distillation but will certainly be lost in the concentration step. So concentration by evaporation, even combined with aroma-recovery, leads to a coffee-extract of poor quality compared with a freshly made domestic brew.

If the extract is concentrated by freeze-concentration it is possible to retain all the aromas in the extract. However, this technique is still a very expensive one.

In the face of the facts that a prime quality extract can be made by using a high water-to-coffee ratio during extraction, thus making a dilute extract, but that it is very expensive to concentrate this extract with sufficient aroma retention, other ways of making such extracts have been tried. It has been tried for example to strip the ground roasted coffee with steam before the extraction with water and add the steam-stripped aroma components during the further processing of the extract. Practice has shown, however, that e.g. instant coffee produced in this manner has a decided lack of what experts call the "fresh brew note". This is due to an incorrect balance of the aromas which constitute the total bouquet of the extract.

It is therefore one object of the present invention to produce a primary extract of ground roasted coffee containing all the aroma components which according to conventional methods are extracted with a high water-to-coffee ratio, but now using a low water-to-coffee ratio. This makes further concentration of this extract unnecessary. In the process according to the present invention use is made of the difference in hydrophilic character, as explained above, and relative volatility with respect to water between some of the aroma components and dry matter, on the one hand, and the rest of aroma components on the other. It has been found according to the invention that the hydrophobic aroma components have a very high relative volatility with respect to water and therefore can be removed from an extract very easily. These aroma components can be removed by all methods known to those skilled in the art. Very good results were obtained by stripping extracts countercurrently with saturated steam at temperatures of about 100° C. in a stripping column. The vapour leaving the column was condensed. The quantity of steam used for stripping extracts was only a few percent of the quantity of extract, e.g. 1 to 10%.

According to the present invention a method is provided for the primary extraction of ground roasted coffee, comprising the following integratable processes (a) a process comprising passing a stream of ground roasted coffee, at elevated temperatures at which substantially no hydrolysis of coffee solids occurs, countercurrently to a stream of aqueous extraction liquid to produce an extract of predetermined concentration, the quantity of said aqueous extraction liquid under the particular process conditions being sufficient to extract substantially all the soluble dry matter from said stream of ground roasted coffee, and being not greater than is desired for the further processing of said extract without the need of concentration; and (b) a process comprising contacting the ground roasted coffee used in the stream of ground roasted coffee mentioned under (a) at temperatures as mentioned under (a) with an aqueous liquid to extract hydrophobic aroma components from said ground roasted coffee; thereupon passing the said extraction liquid through a stripper, in which said hydrophobic aroma components are stripped from said aqueous extraction liquid, and recovering these aroma components as a concentrated aqueous solution.

The countercurrent extraction processes referred to above encompass extraction in all systems of apparatus in which material is introduced continuously or intermittently at one end and extracted material is withdrawn continuously or intermittently at the other end while solvent is passed through the material in the opposite direction. Accordingly, a "stream" of ground roasted coffee as used herein is intended to encompass also those cases in which, as in the well known extraction batteries, the coffee grounds, though actually standing still, progressively change their relative position in the battery. Countercurrent extraction methods and apparatuses for coffee and the like are described e.g. in Perry, "Chemical Engineers Handbook", 5th ed. (1973) section 19, pp. 41–43; Sivets, "Coffee Processing Technology" (1963) Vol. 1 pp 261–320, and U.S. Pat. No. 2,713,009. Stripping processes and apparatuses are described e.g. in Perry, just cited, section 18.

In the process according to the invention the countercurrent extraction mentioned under (a) can be accomplished in a number of units of solid-liquid extraction apparatuses connected in series as well as in one solid-liquid extraction apparatus. The temperatures used in the extraction steps are in the range of 60°–120° C., preferably 90°–100° C. and the ratio of the water flow to coffee flow is in the range of 1.5/1 to 3/1. Generally the soluble solids yield will be about 25% (of the dry weight of the coffee) and the concentration of the extract obtained by process (a) may be 10–40%. Under these conditions only a part of the hydrophobic aromas will be extracted.

In a preferred embodiment of the invention the quantity of aqueous extraction liquid used in the process mentioned under (a) will be just sufficient to extract substantially all the soluble solid dry matter and not more, though in certain processes where a lower concentration is permissible, more water may be used.

FIG. 1 is a flow sheet of an embodiment of the invention whereby the step b is performed after completion of step a.

FIG. 4 is a flowsheet of an embodiment whereby steps a and b are interwined.

Figure 1:
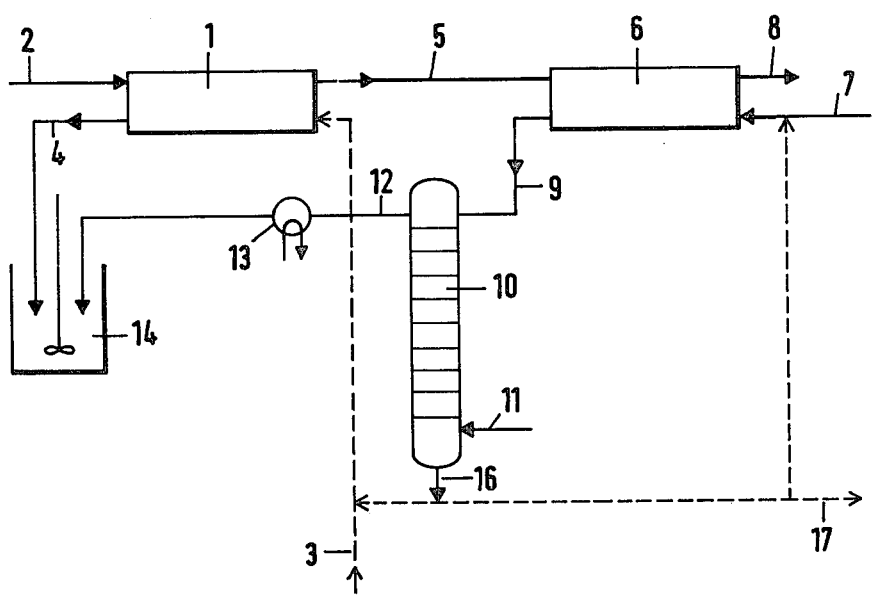

In one possible embodiment of the present invention, the above processes (a) and (b) are carried out separately and one after the other. This embodiment is shown diagrammatically in FIG. 1. In it, process (a) is carried out in an extraction unit 1, to which ground roasted coffee is supplied through conduit 2 and hot water, or hot aqueous extraction liquid, through conduit 3, and from which aqueous extract is discharged through conduit 4.

The coffee thus extracted is supplied through conduit 5 to extraction unit 6 for process (b). Hot water or hot aqueous extraction liquid is passed to extraction unit 6 through conduit 7. The reextracted coffee is discharged at 8. The resulting extract is supplied through conduit 9 to a stripping unit 10, in which it is stripped with steam supplied through conduit 11. Through conduit 12 the resulting mixture of steam and stripped flavours is passed to condenser 13, in which it is condensed. The condenate is added to the extract from extraction unit 1 in vessel 14.

From the point of view of thermal economy, it is recommendable that the steam-stripped aqueous extraction liquid discharged from stripping unit 10 through conduit 16 is recycled to extraction unit 6, at any rate for the greater part. A portion of that liquid may be used in extraction unit 1. The remainder, if there is any, can be discharged through line 17. Naturally, units 1, 6 and 10 may each consist of one apparatus or of a plurality connected in series.

The temperature used in the units 1 and 6 are in the range of 60°–120° C. The ratio of water to coffee in unit 1 is in the range of 1.5:1 to 3:1. Generally the yield will be approximately 25% (of the dry weight of the coffee) and the concentration of the extract may be 10–40%.

In unit 6 very little solids will be extracted as substantially all solids will have been extracted in unit 1. The water-to-coffee ratio is in the range of 5:1 to 20:1.

The quantity of steam used in stripping unit 10 is only a few percent of the quantity of extract obtained in unit 6, e.g. 1 to 10%. This means that the amount of condensate obtained in condenser 13 will be small relative to the quantity of extract obtained in unit 1. This means that the concentration of the extract obtained in unit 1 will be little lowered if the condensate obtained in condenser 13 is added to it, as schematically shown at 14. If necessary, however, the condensate may be concentrated further by distillation before it is added to the extract. The mixture can be stored and sold or dried immediately to instant coffee without further concentration.

According to other preferred embodiments of the invention methods are provided in which processes (a) and (b) are combined and performed simultaneously by tapping the stream of extraction liquid, mentioned under (a) at least partly, at a tapping point or a number of tapping points along the path of the stream of ground roasted coffee, stripping said tapped extraction liquid as mentioned under (b), and re-introducing the stripped liquid as extraction liquid in the process mentioned under (a).

More particularly in one of the methods just mentioned a method is provided in which the stream of ground roasted coffee and the countercurrent stream of aqueous extraction liquid are passed consecutively through a series of extractors and in which the aqueous extraction liquid is stripped between two consecutive extractors to remove the hydrophobic aroma components.

Figure 2:
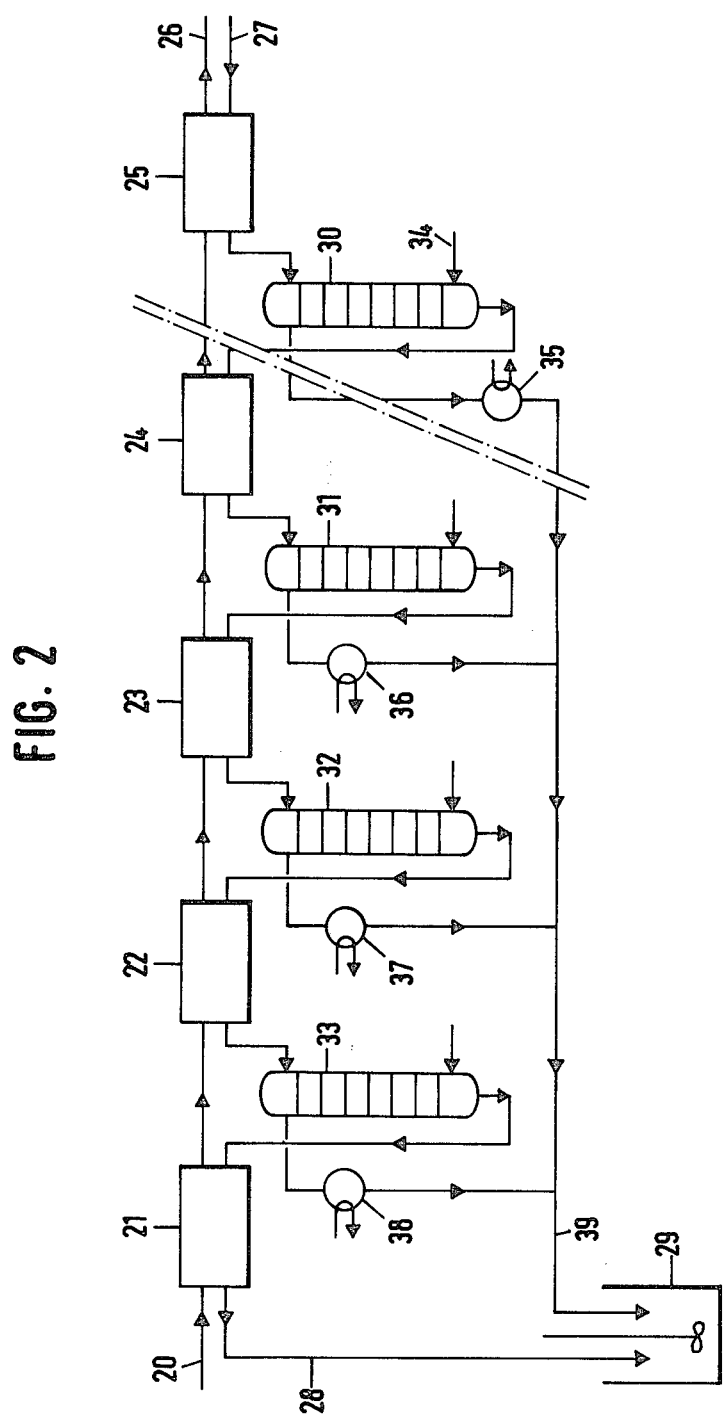
FIG. 2 is a flow sheet of an embodiment of the invention whereby the steps a and b are intertwined, thus performed simultaneously.

This method is illustrated, by way of example, in the accompanying diagrammatic FIG. 2. A stream of ground roasted coffee is supplied at 20 to the first of a plurality of series-connected extractors 21, 22, 23, 24 and 25. These may be "Niro" screw extractors, as will be described in more detail hereinafter. The stream of coffee is passed successively through all extractors and is ultimately discharged as spent material at 26. Provided between the respective pairs of adjacent extractors is a stripper 30, 31, 32, 33. At 27, water is supplied to extractor 25 for extracting the stream of coffee passed through that extractor. The resulting extract is passed to stripper 30, in which it is stripped with steam supplied through conduit 34. The stripped liquid is passed as extraction liquid to extractor 24, and the resulting mixture of steam and flavours is condensed in condenser 35. Similarly the extract produced in extractor 24 is stripped in stripper 31, etc. The extract obtained in extractor 21 is not stripped, but passed direct through conduit 28 to a vessel 29, in which it is mixed with the condensates produced in condensers 35, 36, 37, 38.

It is clear that in the method just described the concentration of the hydrophobic aroma components in the aqueous extraction liquid will be kept very low, for as soon as a fraction of the total quantity is dissolved this fraction is removed by stripping. Due to this low concentration of hydrophobic flavour components in the aqueous extraction liquid a fresh quantity of hydrophobic flavour components will be transferred from the oil phase to the water phase until the value of the partition coefficient is reached. It will thus be possible to extract substantially all the hydrophobic aroma components using a low water-to-coffee ratio.

More preferred is a method in which the aqueous extraction liquid is tapped at each tapping point and a stream of tapped liquid is kept circulating through the ground roasted coffee between the feed out of the stripper and said tapping point.

In one embodiment of this method the tapped aqueous extraction liquid is kept circulating through the ground roasted coffee in a direction transverse to the direction of the stream of ground roasted coffee. An example of this embodiment is schematically shown in the accompanying FIG. 3. In that example, the stream of ground roasted coffee is treated on a horizontal belt extractor. Particulars about this kind of apparatus are described, for example, in Australian Pat. No. 402344. The apparatus is manufactured and sold by Extraction DeSmet S.A., Belgium.

Figure 3:
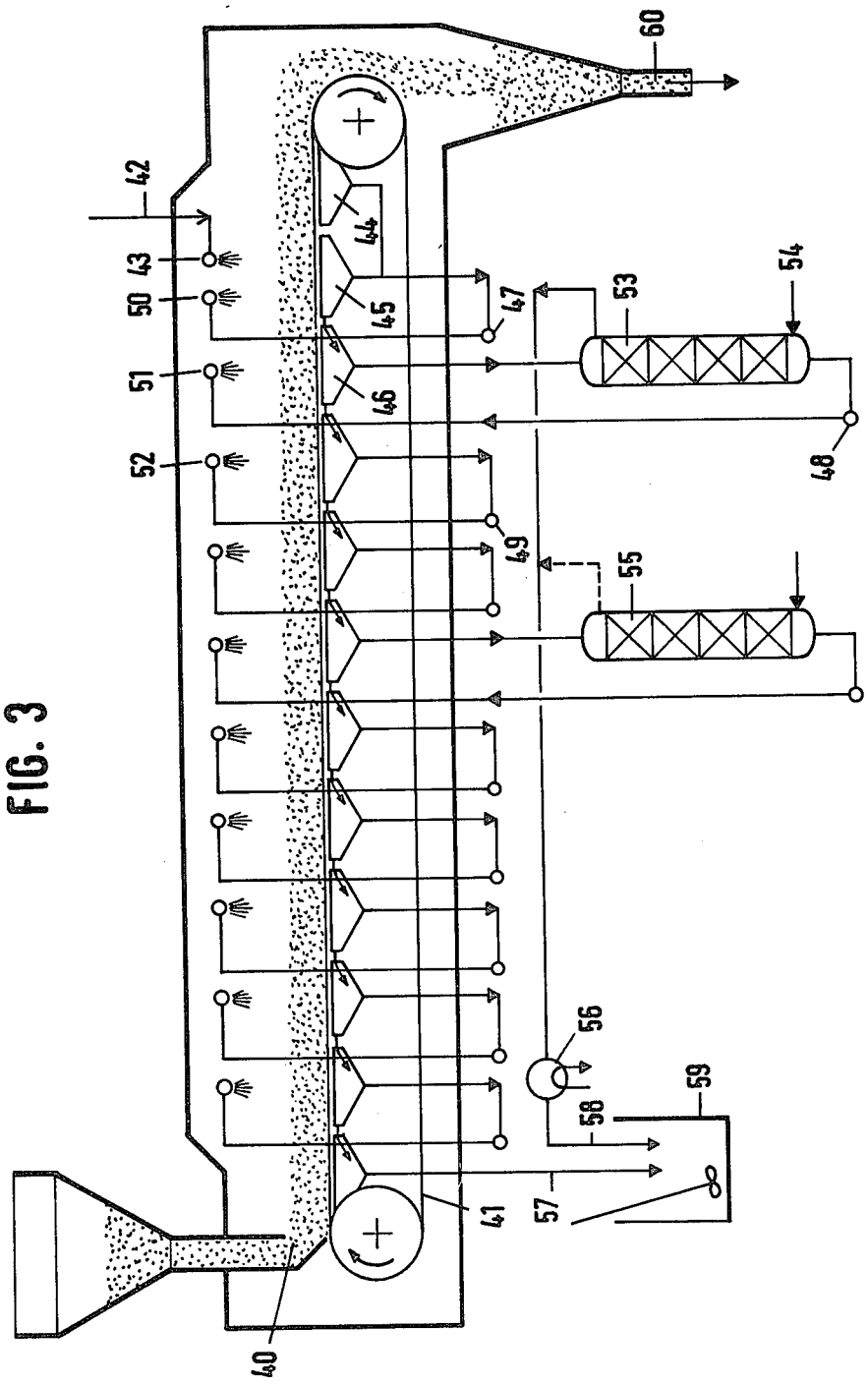
FIG. 3 is a flow sheet of an embodiment of the invention whereby steps a and b are intertwined and a moving belt is used to provide a continuous flow of the ground roasted coffee.

Referring particularly to FIG. 3, in the arrangement shown, ground roasted coffee is supplied at 40 in a substantially uniform layer to a perforate conveyor belt 41. Aqueous extraction liquid is supplied at 43 and sprayed on to the layer of coffee through nozzles 43. The liquid percolating through the layer of coffee is collected in basins 44, 45, 46, etc. and, by means of pumps 47, 48, 49 etc., re-sprayed on to the layer of coffee through nozzles 50, 51, 52, etc. Basins 44, 45, 46, etc. overflow one into the other, as indicated by arrows. Included in the circuit between basin 46 and nozzles 51 is a steam stripper 53, to which steam is supplied at 54. The total system includes one other steam stripper 55. The flavour-laden steam from the steam strippers is condensed at 56. The extract obtained from conduit 57 and the flavour-laden steam condensate obtained from conduit 58 are combined in vessel 59, and the spent grounds are discharged at 60.

Instead of a horizontal belt extractor it is also possible to use an extraction battery in which one or more extractors are connected to one or more strippers and in which a stream of extraction liquid is kept circulating between the extractor(s) and the stripper(s) through the ground roasted coffee.

In still another preferred embodiment of the present invention a method is provided in which the tapped aqueous extraction liquid is kept circulating through the ground roasted coffee in a direction countercurrent to the stream of ground roasted coffee. This embodiment is shown, by way of example, in the accompanying diagrammatic FIG. 4.

Referring to FIG. 4, then, a stream of ground roasted coffee is shown to be supplied at 61 to a plurality of series-connected countercurrent extractors 62, 63, 64, 65, 66. Here again, these may be "Niro" screw extractors. The spent coffee dregs are discharged at 67. At 68, aqueous extraction liquid is supplied to extractor 66. Downstream of each extractor, the greater part of the extraction liquid is tapped, stripped in strippers 69, 70, 71, 72, 73, and recycled to the same extractor. A minor part of the aqueous extraction liquid continues to pursue its path and enters the next extractor or, eventually, is fed out. In this way the concentration of the hydrophobic aroma components in the aqueous extraction liquid can be kept very low indeed, by speeding up the recirculation velocity, which of course can be accomplished independently of the throughput of aqueous extraction liquid through the system as a whole. A larger quantity of hydrophobic aroma components can be extracted per extractor and hence fewer extraction and stripping sections are needed, compared with the method described with reference to FIG. 2.

The spent grounds left by the process according to one of the above mentioned embodiments can be treated further to obtain a higher soluble solids yield from the roasted coffee. This treatment can be any technique known to those skilled in the art, for example, hydrolyzation and extraction with water at high temperature and pressure.

Preferably, however, the coffee dregs are treated as described in U.S. Patent application No. 829,946, now U.S. Pat. No. 4,158,067. This treatment comprises subjecting the wet spent grounds to a high temperature, e.g. 190° C., for a short time, e.g. 5 minutes and then extracting them with water at a relatively low temperature, e.g. 100° C. The extract thus produced can be concentrated and added to the primary extract produced according to the present invention or dried separately.

The present invention will now be further illustrated in and by the following examples.

EXAMPLE 1

In a polit-scale Niro screw-extractor, as described in U.S. Pat. No. 2,713,009, 12 kg/h freshly roasted and ground coffee with an average particle size of 1.0 mm was extracted continuously and countercurrently with 23 kg/h water at a temperature of 98° C. 12 kg/h primary extract with a solids content of about 25% and 23 kg/h primarily extracted coffee with a moisture content of about 63% were obtained. The residence time of the ground coffee in the extractor was about 30 minutes.

The yield obtained in the first extraction stage was about 25%, related to the weight of the dry raw material. The primarily extracted wet coffee was fed into a second pilot-scale Niro extractor and extracted again countercurrently to 100 kg/h at a temperature of 98° C. About 100 kg/h secondary extract with a solids content below 0.05% were obtained. The secondary extract was fed into the top of a stripping column and was stripped countercurrently with saturated steam at a temperature of about 100° C.

The height of the stripping column was 3 m and the diameter 0.1 m. The column was packed with Knitmesh Multifil Packing. The stripped secondary extract was discarded. The vapour leaving the column at the top was condensed. About 3 kg/h aroma solution was obtained, which was added to the primary extract. In this way 15 kg/h extract was obtained with a solids content of about 20%.

After dilution to brew strength this extract was judged by expert tasters and compared with a fresh domestic brew prepared from the same coffee.

Organoleptic evaluation showed that there was hardly any difference between the two brews.

EXAMPLE 2

In a pilot scale DeSmet horizontal belt-extractor, as described in Australian Pat. No. 402,344, 20 kg/h freshly roasted and ground coffee with an average particle size of 1.0 mm was extracted continuously and countercurrently with 38.5 kg/h water at a temperature of about 100° C.

The belt extractor used for the experiments is schematically shown in FIG. 3. Freshly roasted and ground coffee is fed to one end of the extractor, transported through the extractor by an endless belt, and leaves the extractor at the other end. The belt is pervious to liquids. The extractor is divided into twelve sections. Extract is withdrawn from the first section. The following ten sections consist of spray nozzles which spray extract on to the layer of coffee particles, a basin in which the extract flowing through the coffee bed and the belt is collected and a pump by which the extract is recycled from the basin to the spray nozzles. In the last section, without nozzles, extract draining from the coffee bed is collected in the basin pertaining to this section. All basins except for the first one have an overflow of extract to the next basin in such a way that there is a net flow of extract in the direction countercurrent to that of the coffee.

From the tenth section of the belt extractor 100 kg/h extract was withdrawn and passed through a stripping column, in which it was stripped countercurrently with saturated steam at a temperature of about 100° C. The height of the stripping column was 3 mm and its diameter 0.1 m. The column was filled with Knitmesh Multifil Packing. The stripped extract was recycled to the spray nozzles pertaining to the tenth section. The vapour from the column was condensed. About 3 kg/h aroma solution was obtained. The same procedure was effected in the seventh section of the belt extractor, using an identical stripping column. From this column another 3 kg/h aroma solution was obtained.

About 20 kg/h extract with a solids content of 25% was withdrawn from the first section of the belt extractor. To this extract the aroma solutions obtained were added giving 26 kg/h extract with a solids content of about 19.2%. After dilution to brew strength this extract was judged by expert tasters and compared with a fresh brew prepared from the same roasted coffee by filtering. The evaluations showed that the quality of the product obtained by the process of the invention was close to that of the fresh brew.

I claim:

1. A multi-stage method for the primary extraction of ground roasted coffee, comprising the following two integrated steps:
   (a) passing a stream of ground roasted coffee through a number of stages, at elevated temperatures between 60° and 120° at which substantially no hydrolysis of coffee solids occurs, countercurrently to a stream of aqueous extraction liquid to produce an extract of predetermined concentration, the ratio of liquid to coffee being in the range of 1.5:1 to 3:1, said aqueous extraction liquid extracting substantially all the soluble solids from said stream of ground roasted coffee to produce a concentrated liquid, which aqueous extraction liquid of itself would not be sufficient to extract all of the hydrophobic aroma components; and
   (b) recovering substantially completely the hydrophobic aroma components from the extracted stream of ground roasted coffee without hydrolyzing said coffee by extraction with an aqueous extraction liquid at temperatures mentioned under (a) in combination with steam stripping of the extract produced by said hydrophobic aroma component extraction and recovering the aroma components as a concentrated aqueous aroma solution by condensation of the steam used for the stripping.

2. A method according to claim 1 wherein the stream of ground roasted coffee and the countercurrent stream of aqueous extraction liquid are passed consecutively through a series of extractors and wherein the aqueous extraction liquid is stripped from the hydrophobic aroma components between two consecutive extractors.

3. A method according to claim 1, wherein the stream of aqueous extraction liquid is tapped partly at each of a plurality of points, and recirculated through a steam stripper, in such a way that a stream of tapped liquid is kept circulating through the ground roasted coffee between the feed-out of each stripper and each of said tapping points.

4. A method according to claim 3, wherein the tapped aqueous extraction liquid is kept circulating through the ground roasted coffee in a direction transverse to the direction of the stream of ground roasted coffee.

5. A method according to claim 4, wherein the stream of ground roasted coffee is obtained by treating the ground roasted coffee on the moving belt of a horizontal belt extractor.

6. A method according to claim 3, wherein the tapped aqueous extraction liquid is kept circulating through the ground roasted coffee in a direction countercurrent to the stream of ground roasted coffee.

7. A method as in claim 1 including the further step of adding the condensate to the concentrated liquid.

8. A method as in claim 1 wherein said step (b) takes place after step (a).

9. A method as in claim 8 wherein the ratio of liquid to coffee in step (b) is in the range of 5:1 to 20:1.

* * * * *